US006842621B2

(12) United States Patent
Labun et al.

(10) Patent No.: US 6,842,621 B2
(45) Date of Patent: Jan. 11, 2005

(54) METHOD AND APPARATUS FOR SPLITTING CONTROL AND MEDIA CONTENT FROM A CELLULAR NETWORK CONNECTION

(75) Inventors: Nicholas Labun, Chicago, IL (US); Shao Weipan, Lake Zurich, IL (US); Anthony Kobrinetz, Hoffman Estates, IL (US); Angel Fernando Favila, Lake In The Hills, IL (US); Peisong Huang, Elk Grove Village, IL (US); Charles Malek, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/037,956

(22) Filed: Dec. 21, 2001

(65) Prior Publication Data

US 2003/0119527 A1 Jun. 26, 2003

(51) Int. Cl.[7] .................................................. H04Q 7/20
(52) U.S. Cl. ................................ 455/456.3; 455/422.1; 455/411
(58) Field of Search ................................. 455/426, 422, 455/67.1, 552, 560, 414, 456, 411; 709/201, 202, 203; 370/493, 494, 495, 522, 527, 529, 351–356, 400, 401, 535

(56) References Cited

U.S. PATENT DOCUMENTS 6,272,549 B1 * 8/2001 Daniel ......................... 709/246
6,285,667 B1 * 9/2001 Willars et al. ............... 370/329
6,404,746 B1 * 6/2002 Cave et al. .................. 370/262
2001/0009852 A1 * 7/2001 Liu et al. ..................... 455/426
2002/0032027 A1 * 3/2002 Kirani et al. ................ 455/426
2002/0132611 A1 * 9/2002 Immonen et al. ........... 455/414
2003/0045275 A1 * 3/2003 McDonagh et al. ........ 455/414

FOREIGN PATENT DOCUMENTS

| WO | WO 01/35585 A1 | 5/2001 |
| WO | WO 01/37497 A1 | 5/2001 |
| WO | WO 01/52488 A1 | 7/2001 |
| WO | WO 01/52573 A1 | 7/2001 |

* cited by examiner

Primary Examiner—Jean Gelin
(74) Attorney, Agent, or Firm—Hisashi D. Watanabe

(57) ABSTRACT

This invention provides a system and method for splitting control and media content signals of a cellular network connection of a mobile station. A mobile station engages in a WAP browsing session with a cellular network connection over an air interface. As a user moves into coverage area of an access point, another browsing session is established between the mobile station and a non-cellular network connection. More specifically, the user's WAP browsing session with a cellular network connection is upgraded to a Web browsing session with a non-cellular network connection. The present invention permits a user to control a Web browser on a remote device by providing user input to the mobile station. In particular, a media content portion of the cellular network connection is split and rerouted to the remote device, and a control portion of the cellular network connection is split and rerouted either via the non-cellular network connection or via the cellular network connection.

25 Claims, 6 Drawing Sheets

METHOD AND APPARATUS FOR SPLITTING CONTROL AND MEDIA CONTENT FROM A CELLULAR NETWORK CONNECTION

FIELD OF THE INVENTION

The present invention relates generally to the field of mobile communication systems and, more particularly, to a system and method for splitting control and media content from a cellular network connection.

BACKGROUND OF THE INVENTION

The Wireless Application Protocol ("WAP") has been developed to enable Internet browsing via a mobile station, such as a handheld cellular device. A mobile station equipped with a WAP Browser may access the Internet via a cellular network. The cellular network provides a connection from the mobile station to a WAP Gateway, which acts as a translator or proxy server. The WAP Gateway achieves this function by sending requests for information to a Web Server, receiving a response, and then converting this information to the WAP protocol such that the mobile can display it. The cellular network, with its relevant air interface, is the bearer of the WAP protocol stack.

While WAP enables Internet access via a mobile station, there are limitations. In particular, the typical size of a display for a mobile station is small relative to a desktop or notebook computer, and the typical memory capacity of a WAP-capable mobile station also limited. Also, the function of downloading and displaying graphics files or video files requires greater bandwidth than text message or control signals. Multiple traffic channels from the cellular network may be required to provide the greater bandwidth to a single user, and this bandwidth requirement puts a strain on the capacity of the cellular network. Further, a user accessing the Internet via a desktop computer may utilizes a high bandwidth connection and, thus, downloads and views large files, including graphic and video files, whereas a WAP user may not.

The two means for accessing the Internet or an intranet, WAP and Web browsing, are distinct and separate. A user of a mobile station may enjoy the capability of WAP Internet access at the expense of a higher bandwidth connection. A user of a desktop or notebook computer having a broadband network connection may enjoy a high bandwidth connection at the expense of mobility. Ideally, the two means would merge such that a user could enjoy high bandwidth connections and mobility. Therefore, a need exists for a system and method for splitting control and media content from a cellular network connection.

SUMMARY OF THE INVENTION

To address the above-mentioned need, a system and method for splitting the aspects of control and media content from a cellular network connection is provided herein. Initially, a position of the mobile station relative to an access point of a non-cellular network connection is determined by measuring a signal strength of the mobile station by the access point. Also, a status of the mobile station is determined when the mobile station is within a proximity of the access point. In particular, the status is requested when the mobile station is engaged in a data session with the cellular network connection and is within a proximity of the access point and, then, the status of the mobile station is received. Next, the mobile station is authenticated for permission to access a non-cellular network connection and services associated with the non-cellular network connection. Thereafter, a media content portion is split from the cellular network connection and rerouted to a remote device via the non-cellular network connection. In particular, a connection of the mobile station is switched from the cellular network connection to the non-cellular network connection, a communication link is assigned from the mobile station to a remote device, and a user input generated at the mobile station is translated into a signal that controls an action exhibited by the remote device.

The present invention is also a wireless communication system for switching network connections between at least one mobile station and a gateway. The system comprises a gateway, a mobile station, a first network and a second network. The gateway generates content data and receives control data, and the mobile station generates the control data and receives the content data. The first network is connected to the gateway and is capable of communicating with the mobile station via a first wireless link. The first network transfers the content data from the gateway to the mobile station and the control data from the mobile station to the gateway. The second network is connected to the gateway and includes a remote output device. The remote output device, such as a multimedia display, is capable of receiving the content data from the gateway and presenting at least a portion of the content data as visual and/or audio information. For one embodiment, the second network includes an access point that is capable of communicating with the mobile station via a second wireless link and forwarding the control data from the mobile station to the gateway. In another embodiment, the content data switches between being provided to the mobile station via the first network and being provided to the remote output device of the second network, whereas all of the control data is provided to the gateway via the first network.

DETAILED DESCRIPTION OF THE PREFERRED EMBODIMENTS

Figure 1:
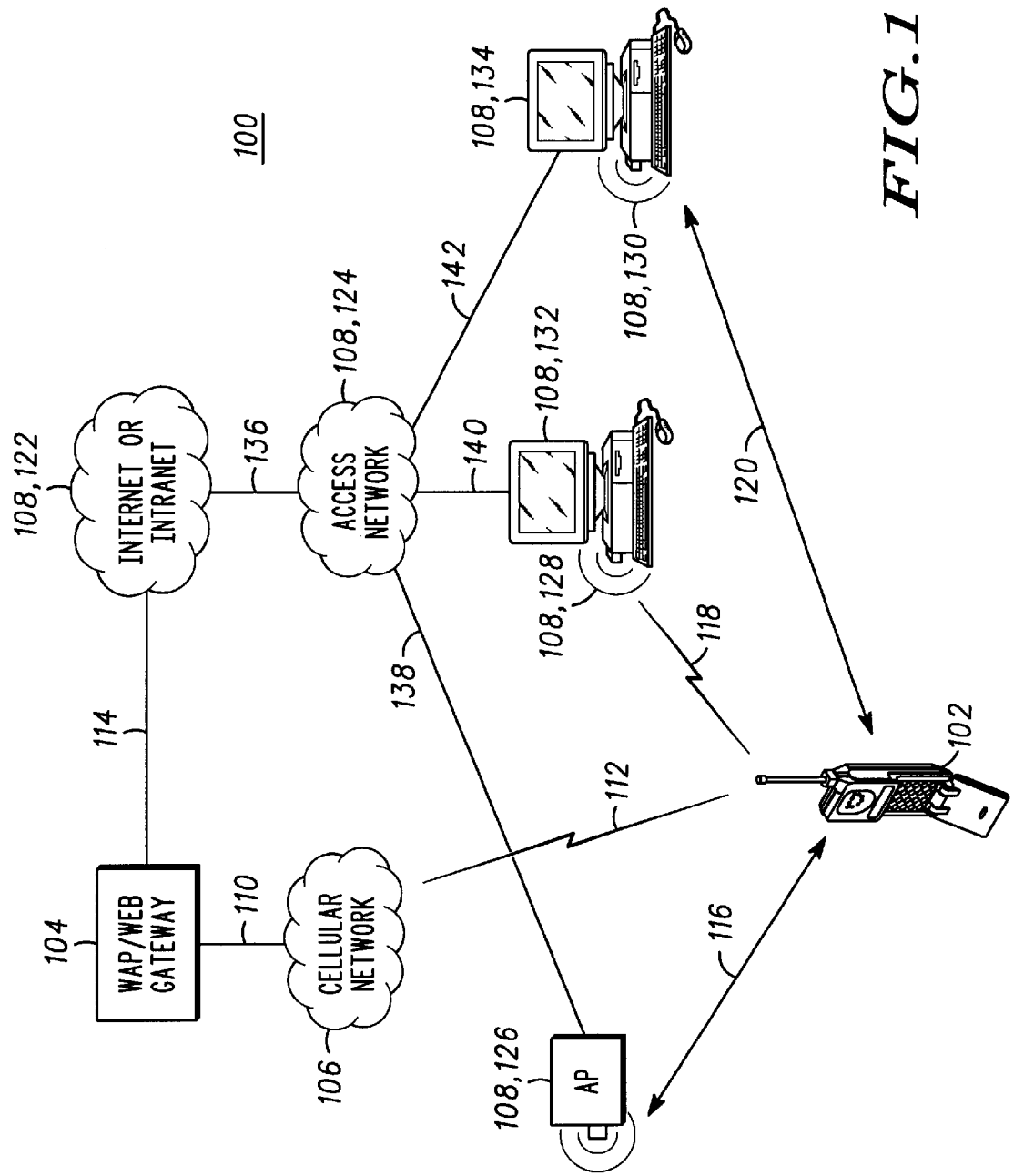
FIG. 1 is a block diagram representing a communication system that may be adapted to operate in accordance with a first preferred embodiment of the present invention.

The present invention relates to a method and apparatus for splitting control and media display from a cellular network connection. For the preferred embodiments described herein, a first network connection is established between a mobile station and a cellular network and, then, a network data session is initiated for web browsing. The network data session may utilize a wireless browsing protocol, such as the Wireless Application Protocol ("WAP"). A second, non-cellular network connection may be established between the mobile station and a remote device. For the preferred embodiment, the second network connection utilizes Bluetooth™ wireless technology which is supported by the Bluetooth™ Special Interest Group, but it is to be understood that any air interface technology may serve such as the HomeRForm technology which is supported by the HomeRFm Working Group, and Wi-Fi (IEEE 802.11, IEEE 802.11b, etc.) technology which is supported by the Institute of Electrical and Electronics Engineers and the Wireless Ethernet Compatibility Alliance.

For the preferred embodiments, a Bluetooth access network determines whether the mobile station is within proximity of an access point ("AP"). A Bluetooth Radio Network Controller ("BRNC") makes this determination based on a signal strength measured from the mobile station to a given access point. The Bluetooth Radio Network Controller then requests the activity engaged by the mobile station to determine the type of connection to establish. Depending upon the relative distance of the mobile from the given access point, the Bluetooth Radio Network Controller will (1) transfer communications for the mobile station from a web browsing session over the first network connection, i.e., cellular network, to a web browsing session over the second network connection, i.e., Bluetooth network, or vice versa, (2) transfer communications for the mobile station from a web browsing session to a remotely-controlled web browsing session of a Remote Device or vice versa, or (3) handover of communications for the mobile station to another access point.

Each mobile station is authenticated prior to establishment of a connection with the second network connection and/or for purposes of accessing resources or functional entities, such as a Web Browser, residing on a remote device. Authentication may determine the services that a mobile station may access. The mobile station can then exercise control of an operation or functional entity on the remote device via the first and/or second network connections. This control can be facilitated by a user interface of the mobile station, such as, for example, a joystick or keys on a keypad of the mobile station. The path of communication for the control output from the mobile station is dependant upon the type of remote device, and particularly upon the functional entities resident upon the remote device.

A mobile station connected to one remote device may, upon moving in proximity to another remote device that is closer, handover control to the closer remote device. A user may activate or deactivate a mobile station's capability for making another connection to a remote device using a user selection feature.

Turning now to the drawings where like numerals designate like components, FIG. 1 illustrates an operation of a first preferred embodiment 100 of the present invention. The present invention comprises one or more mobile stations, one or more gateways, and two or more networks transferring information between the mobile stations and gateways. As shown in FIG. 1, the first preferred embodiment 100 comprises a mobile station 102, a gateway 104, a first network 106 and a second network 108. The first network 106 is connected to the gateway 104 via network link 110 and capable of coupling to the mobile station 102 via wireless link 112. The second network 108 is connected to the gateway 104 via network link 114 and capable of coupling to the mobile station 102 via wireless links 116, 118, 120. The second network 108 comprises an Internet or intranet 122, an access network 124, at least one access point 126, 128, 130 and at least one output component 132, 134. The Internet or intranet 122 is connected to the gateway 104 via network link 114, the access network 124 is connected to the Internet or intranet via network link 136, and the access points 126, 128, 130 and output components 132, 134 are connected to the access network via network links 138, 140, 142, directly or indirectly. The access points 126, 128, 130 are also capable of coupling to the mobile station 102 via the wireless links 116, 118, 120.

The first network 106 is a cellular network having wide-range wireless communication capabilities and the second network 108 is a wireless local area network ("wlan") or wireless personal area network ("wpan") having short-range wireless communication capabilities. The first network 106 may utilize a wide variety of wide-range technologies including, but not limited to, radiotelephone communication technologies (such as Analog, CDMA, GSM, TDMA, UTMS and their derivatives), paging technologies, and the like. Web browsing protocols, such as HTML, C-HTML, WAP and the like, may be used in conjunction with these widerange technologies. The second network 108 may utilize a wide variety of shortrange technologies including, but not limited to, Bluetooth™ wireless technology, HomeRF™ technology and Wi-Fi (IEEE 802.11, IEEE 802.11b, etc.) technology.

Still referring to FIG. 1, the mobile station 102 may establish a web browsing session with the first network 106 and communicate with the gateway 104. Although not shown in FIG. 1, the gateway 104 may provide connections to one or more servers on a network or include one or more servers. Regardless of the location of the servers, at least one server is capable of generating content data for the mobile station 102 and receiving control data from the mobile station. The output components 132, 134 may be simple display devices or more complex computers/terminals that connect to the network. The content displayed upon the output components 132, 134 is generated and received from a server connected to the gateway 104. As stated above, the server may be, but is not necessarily, resident on the same physical entity as the gateway 104.

Access points 126, 128, 130 send inquiry messages over wireless links, such as wireless links 116, 118, 120, for receipt by various mobile stations. If the mobile station 102 wanders to a location where an access point (such as access point 126) is present and receives an inquiry message from the access point via a wireless link (such as wireless link 116), then the mobile station 102 sends a response message back to the access point via the wireless link.

The Radio Signal Strength Indicator ("RSSI") of the mobile station 102 is utilized for assigning an access point to the mobile station 102. An access point threshold value for the RSSI is set as an access network parameter, and any access point (such as access points 126, 128, 130) that perceives an RSSI from the mobile station 102 that is greater than the access point threshold value becomes a candidate for connection to mobile station. The access point that perceives the largest RSSI value, among the candidates for connection to the mobile station 102, initiates connection procedures for mobile station 102. The access network 124 determines which access point initiates the connection procedure for the preferred embodiments but, in the alternative, the mobile station 102 or the access points 126, 128, 130 may make this determination. For the first preferred embodiment, the access points 126, 128, 130 measure the RSSI of Bluetooth signals received from the mobile station 102 via wireless links 116, 118, 120, respectively. If the access point 126 perceives the greatest RSSI from the mobile station 102, and the RSSI value is greater than the access point threshold value, connection procedures are initiated. Utilization of the RSSI of the mobile station 102, as described above, ensures that the mobile station will be connected to the closest possible access point.

For the preferred embodiments, the access network 124 includes two additional threshold values. A connect threshold value is used to determine when to convert the mobile station's WAP session to a WEB session utilizing a remote device, such as a desktop computer or a network connected monitor, to display a web browsing session to a user. For example, output components 132, 134 represent such remote devices. The connect threshold value is also used to indicate that the mobile station 102 has moved into a closer position relative to a given access point than was required to establish the initial connection from the mobile station to the access point. A disconnect threshold value is greater than the access point threshold value but less than the connect threshold value. The disconnect threshold value is used to determine when the mobile station 102 has moved away from a remote device such that the mobile station should be disconnected from the Web session and returned to a WAP session.

By defining and measuring the above three RSSI thresholds for a mobile station 102, the access network 124 is able to define areas of motion for a user. Once the mobile station 102 is within a proximity of an access point, the mobile station connects to the access point and enjoys a higher bandwidth connection. Further, when the mobile station 102 comes within the proximity of the remote device, the mobile station and its user will be able to take the functions and features of the remote device.

In addition to the general connection mechanism described above, there are three scenarios that determine the type of connections established among the mobile station 102, the first network 106, and the access points 126, 128, 130 of the second network 108. In the first scenario, the connection to the first network 106 is released such that control data and media content data are no longer transmitted via the first network. The control data is transmitted from the mobile station 102 to one of the access points 126, 128, 130 via the corresponding wireless link 116, 118, 120, and the media content data is sent to the corresponding remote device or output component 132, 134 over the second network 108. In the second scenario, the connection to the first network 106 is maintained for purposes of sending the control data, but the media content data is no longer transmitted via the first network. Instead, the media content data is sent to a remote device or output component 132, 134 over the second network 108 similar to the first scenario. For the preferred embodiments, the determination of whether the connection to the first network 106 will be retained or disconnected is dependant upon the characteristics and network connections of the remote device or output component 132, 134. However, it is to be understand that this determination may be made pre-programmed by a network operator or determined by user input at the mobile device 102, or another means of remote access to user preference settings such as a web browser interface from a computer.

For the first scenario described above, there are several possible configurations. In a first configuration for the first scenario, a remote device may include an output component 132, such as a desktop computer having a Web browser installed, and an access point 128, 130 integrated in remote device 106. If an RSSI measured from mobile station 102 at the access point 128 is above the connect threshold value, a control data connection will be established from the mobile station 102 to the access point. The mobile station 102 will then send control data from its user interface to the Web browser residing on the desktop computer via the wireless link 118 and the first network 106 will be disconnected.

If mobile station 102 moves to an area where its RSSI perceived at the access point 128 drops below the disconnect threshold value, a timer is set. If mobile station 102 remains in that area where its RSSI remains below the disconnect threshold value for the duration of the timer, the mobile station 102 is disconnected from the Web browsing session and returned to a WAP connection via the first network 106. If the RSSI increases above disconnect threshold value within the duration of the allowable time period, the timer will be reset and the mobile station 102 is not disconnected from the Web browsing session. Therefore, as the mobile station 102 gets physically close to a remote device (or, more particularly, its access point), the mobile station will be able to browse the Web using the user interface of the mobile station and the output component (such as its display and speakers) of the remote device. When the mobile station 102 moves away from the remote device (or its access point), the remote device will disconnect and the mobile station will return to WAP browsing using the user interface, display and/or speakers of the mobile station.

Figure 2:
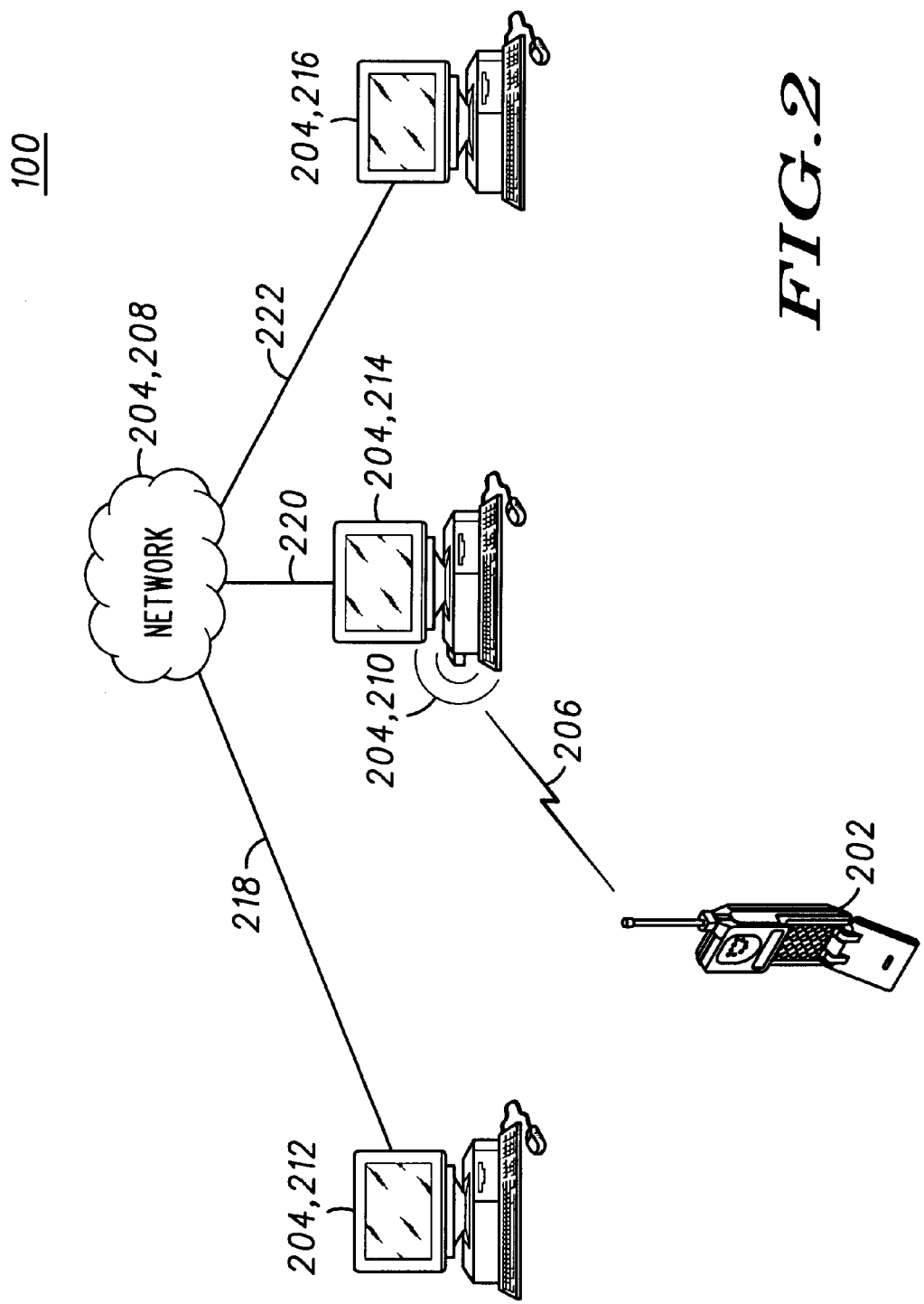
FIG. 2 is a block diagram representing another communication system that may be adapted to operate in accordance with the first preferred embodiment of FIG.

Referring to FIG. 2, as an alternative to the configuration shown in FIG. 1, the first preferred embodiment 100 may comprise a mobile station 202, a gateway (shown in FIG. 1 as 104), a first network (shown in FIG. 1 as 106) and a second network 204. The second network 204 is connected to the gateway 104 and capable of coupling to the mobile station 202 via wireless link 206. The second network 204 comprises general network 208 (which may include an Internet, intranet, and/or access network), an access point 210 and at least one output component 212, 214, 216. The general network 208 is connected to the gateway 104, and the access point 210 and output components 212, 214, 216 are connected to the general network via network links 218, 220, 222, directly or indirectly. The access point 210 is also capable of coupling to the mobile station 202 via the wireless link 206.

For a second configuration for the first scenario, an access point 210 may only be associated with one or more remote devices instead of being integrated in a particular remote device. For example, one large conference room may have a single access point 210. Several output components 212, 214, 216 (such as workstations with displays or simple network connected displays) may be connected to a general network 208 (such as an intranet) and associated with the single access point 210. A mobile station 202 entering the room would establish a connection via the access point 210. The general network 208 would then search for an available resource associated with the access point 210. Therefore, the mobile station 202 may be assigned to any output component 212, 214, 216 (i.e., workstation or display) within the conference room, as all output components within the room are associated with the same access point 210.

As shown in FIG. 2, the remote device is an output component 214 (namely a workstation) with integrated Bluetooth capability and, thereby, functions as an access point 210. The other output components 212, 216 are not Bluetooth capable and are connected to the general network 208 via network links 218 and 222 respectively. The access point 210 is connected to the general network 208 via network link 220, and is associated with output components 212, 214, 216 such that the general network permits the mobile station 202 to utilize visual and audio output capabilities on any of these output components so long as they are available and the mobile station 202 is coupled to access point 210. Likewise, the functionality of the system would not change if the access point 210 is a stand-alone unit and, thus, is not integrated with the output component 214.

Multiple mobile stations may establish connections with the access point 210 simultaneously and operate remote devices or output components 212, 214, 216 associated with the access point, provided that resources resident on the remote devices or output components are available. In the alternative, an integrated access point 210 may be associated only with the functional entities residing on its respective remote device or output component. In such case, a mobile station 202 establishing a connection to the access point 210 would have the capability of interfacing with functional entities of the specific remote device or output component only.

Figure 3:
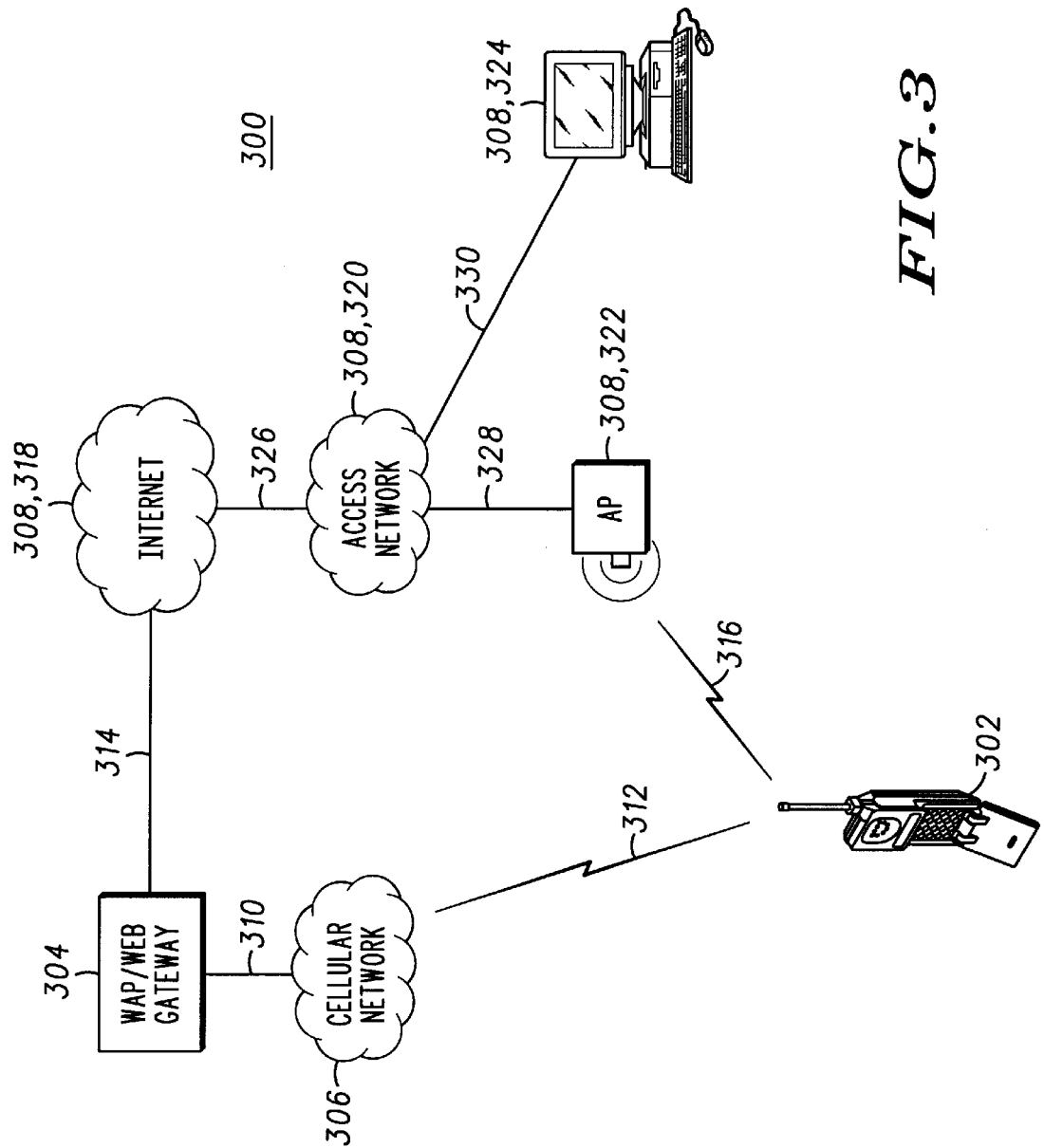
FIG. 3 is a block diagram representing a communication system that may be adapted to operate in accordance with a second preferred embodiment of the present invention.

Referring to FIG. 3, a second preferred embodiment 300 of the present invention comprises a mobile station 302, a gateway 304, a first network 306 and a second network 308. The first network 306 is connected to the gateway 304 via network link 310 and capable of coupling to the mobile station 302 via wireless link 312. The second network 308 is connected to the gateway 304 via network link 314 and capable of coupling to the mobile station 302 via wireless link 316. The second network 308 comprises an Internet or intranet 318, an access network 320, an access point 322 and at least one output component 324. The Internet or intranet 318 is connected to the gateway 304 via the network link 314, and the access point 322 and the output component 324 are connected to the Internet or intranet, directly or indirectly. For example, as shown in FIG. 2, the access network 320 is connected to the Internet or intranet 318 via network link 326, the access point 322 is connected to the access network 320 via network link 328, and the output component 324 is connected to the Internet or intranet via network line 330. The access point 322 is also capable of coupling to the mobile station 302 via the wireless link 316.

For the second preferred embodiment 300, the mobile station 302 is engaged in a Web Browsing session and the Web browser is displayed on the output component 324. The output component 324 is a display connected to the Internet or intranet 318. The mobile station 302 generates and transmits control data to first network 306, and the first network forwards the control data to the gateway 304. The media content data sent from the gateway 304 is transmitted through the Internet or intranet 318 and displayed upon output component 324. In this case, access point 322 determines a proximity of the mobile station 302 relative to output component 324. In a wireless network where multiple access points are employed, these access points may in combination be used to determine the location of the mobile station relative to an output component. For the second preferred embodiment 300, a user of the mobile device 302 benefits from a high bandwidth connection to the output component 324, which is viewable by the user, without the need for additional traffic channels via the first network 306. The user may, therefore, view a high-resolution image or video file on the output component 324 and have control over the file (such as, for example, VCR controls including rewind, pause, etc.) via the first network 306.

Similar to the first preferred embodiment 100 above, the second preferred embodiment 300 utilizes the Radio Signal Strength Indicator ("RSSI") of the mobile station 302 for managing the mobile station's connection to the first and second networks 306, 308. An access point 322 is assigned to the mobile station 302 based upon a comparison of the RSSI to an access point threshold value. Also, the mobile station 302 may be disconnected from the first network 306 and connected to the second network 308 dependent upon a comparison of the RSSI to a connect threshold value, and the mobile station may be disconnected from the second network and returned to the first network dependent upon a comparison of the RSSI to a disconnect threshold value. Thus, similar to the first preferred embodiment 100, the second preferred embodiment 300 enables a user to enjoy the best network connection available and the best access options available depending on the user's surroundings.

Figure 4:
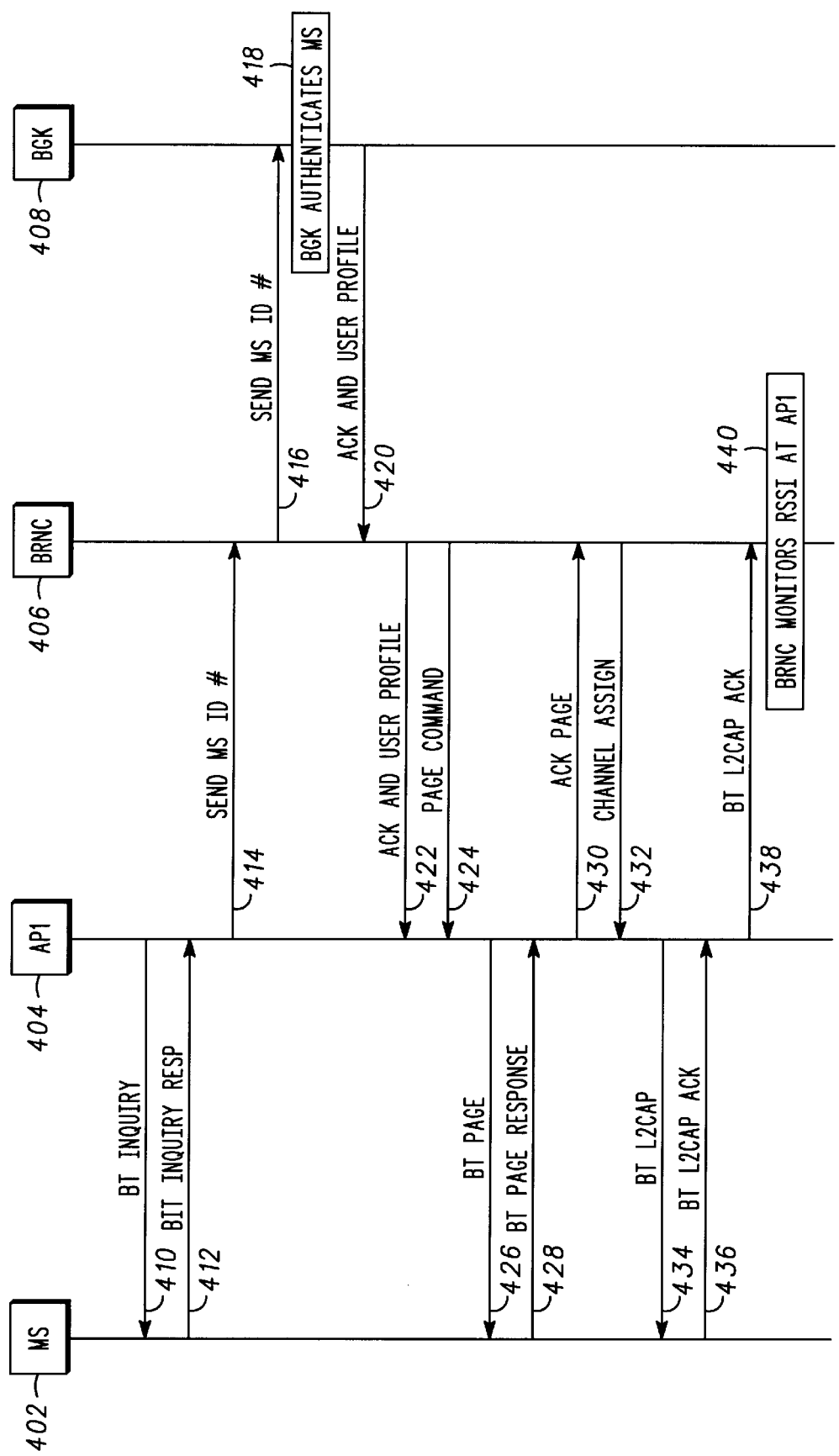
FIG. 4 is a timing diagram representing message flow for establishment of a Bluetooth connection in accordance with the preferred embodiments of the present invention.

Referring to FIG. 4, there is provided a timing diagram representing message flow for establishment of a short-range connection, namely a Bluetooth connection, in accordance with the preferred embodiments of the present invention. The network elements comprise a mobile station ("MS") 402, a first access point ("AP1") 404, a Bluetooth Radio Network Control ("BRNC") 406, and a Bluetooth Gate Keeper ("BGK") 408, and are referenced at the top of FIG. 4. Initially, the MS 402 is connected to a first network, such as first networks 106 and 306 in FIGS. 1 & 3, respectively, and engaged in a WAP session over the first network. Then, as the MS 402 moves into an area where the AP1 404 (or any other access point) is located, the MS becomes subject to detection by the AP. The message flow illustrated by FIG. 4 assumes that MS 402 is engaged initially in a WAP session, and is within the radio coverage area of the AP1 404.

The message flow for establishing a short-range connection, namely a Bluetooth connection, comprises the steps discussed below. At step 410, the AP1 404 sends an inquiry message over the Bluetooth radio interface that is received by MS 402. At step 412, the MS 402 sends a response to the AP1 404 containing its electronic identification number and indicating that it is present in the AP1 radio coverage area. The AP1 404 forwards the MS response to the BRNC 406 at step 414, and the BRNC 406 forwards this information to the BGK 408 at step 416. At step 418, the BGK 408 looks up the MS 402 electronic identification number in a local database. If the MS 402 is not registered, the BGK 408 will send a broadcast message to other gatekeepers requesting authorization of the MS. If the BGK 415 is successful in authorizing the MS 402, an acknowledgement message that includes a user profile is sent to the BRNC 406 at step 420, and the BRNC 406 forwards this information to the AP1 404 in step 422. At step 424, the BRNC 406 then notifies AP1 404 via a message to send a page to the MS 402. At step 426, the AP1 404 proceeds to send a page to the MS 402 via a message. At step 428, the MS 402 responds to the AP1 404 via a message. At step 430, the AP1 404 notifies the BRNC 406 via a message that a response was received from MS 402. At step 432, the BRNC 412 authorizes the AP1 404 via a message to assign resources to the MS 402. At step 434, the AP1 404 sends a L2CAP message to establish a L2CAP link. The MS 402 sends an acknowledgement message to the AP1 404 at step 436, and the AP1 404 notifies the BRNC 406 that the MS 402 received the L2CAP message at step 438. Finally, at step 440, the AP1 404 goes into standby mode and the BRNC 406 monitors the RSSI generated by MS 402.

At this point a short-range connection is established between MS 402 and AP1 404 via the second network (shown in FIGS. 1 through 3). The MS 402 utilizes short-range connection as the bearer technology for its WAP session. The benefit of this connection and the procedure illustrated by FIG. 4 is that a mobile station can be authenticated by its home network and, then, utilize a higher bandwidth connection of a second network. The cellular network thereby saves traffic channel resources. The AP1 404 monitors the RSSI of the MS 402 for the purpose of determining when to (1) switch from a WAP session on a first network to a conventional Internet protocol session with output components on a second network, (2) break the short-range connection and allow the mobile station to return to the previous WAP session of the first network, or (3) handover to a second access point. An operation of handing-over to a second access point would occur if the RSSI from the MS 402 to AP1 404 drops below the access point threshold value, described above, and remains below this threshold for a certain period of time, and a second access point perceives a RSSI from MS 402 that is greater than the connect threshold value.

Figure 5:
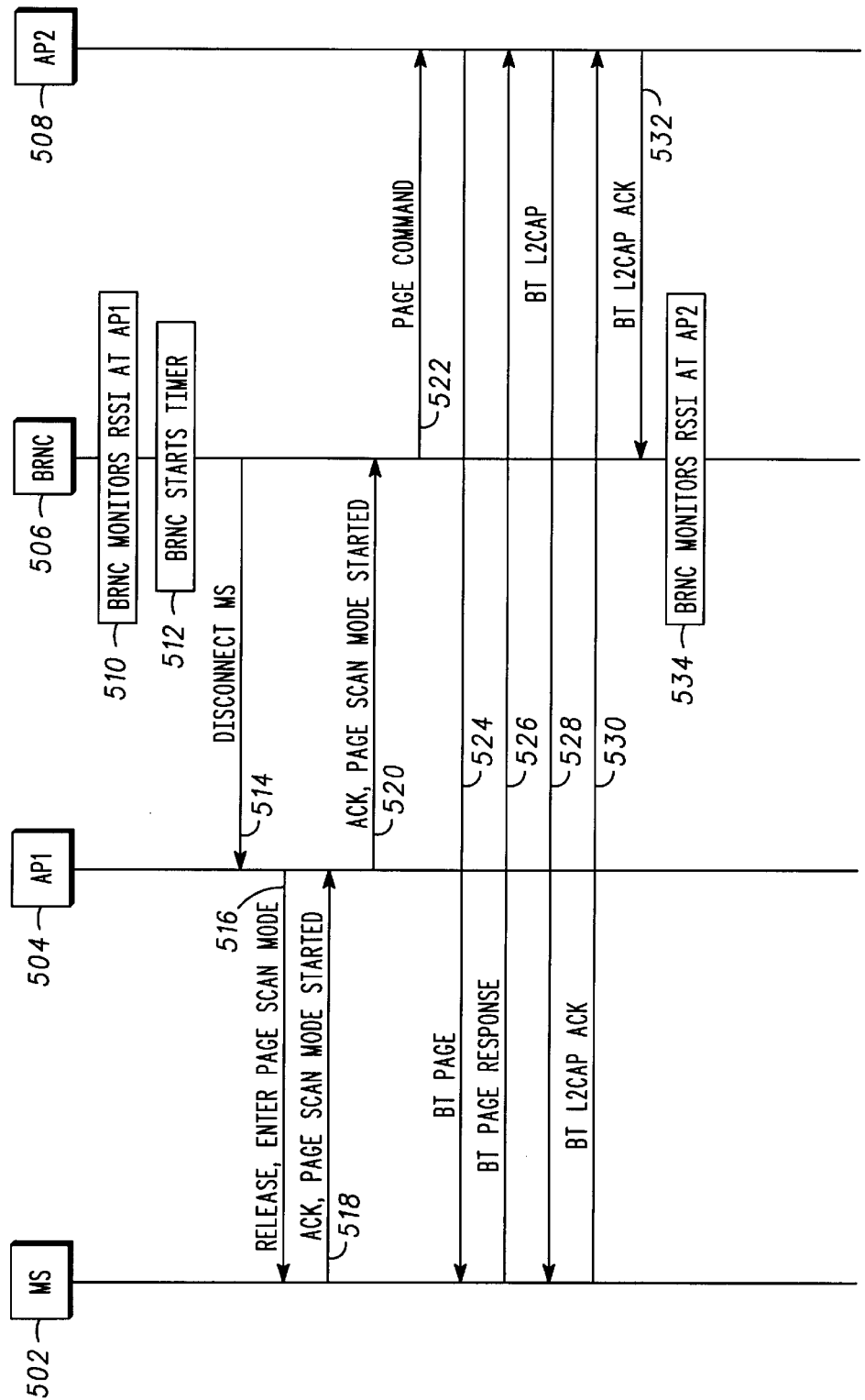
FIG. 5 is a timing diagram representing message flow for handovers between Bluetooth access points in accordance with the preferred embodiments of the present invention.

Referring to FIG. 5, there is provided a timing diagram representing message flow for handovers between access points in accordance with the preferred embodiments of the present invention. The network elements comprise a mobile station ("MS") 502, a first access point ("AP1") 504, a Bluetooth Radio Network Control ("BRNC") 506, and a second access point ("AP2") 508, and are referenced at the top of FIG. 5. At step 510, the BRNC 506 is continuously monitoring the RSSI at the connected the AP1 504. At step 512, the BRNC 506 sets a timer when the RSSI of the MS 502 drops below the access point threshold value. The timer serves as a hysteresis timer to prevent a ping-pong handover effect that could occur if the MS 502 moves into an edge of a proximity or coverage area of AP1 504. At step 514, the BRNC 506 sends a disconnect command to the AP1 504 if the timer times out. At step 516, the AP1 504 sends a release message to the MS 502 and instructs the MS 502 to enter a page scan mode. At step 518, the MS 502 sends an acknowledgement message to AP1 504 and confirms that it has entered the page scan mode. At step 520, the AP1 504 informs the BRNC 506 that the MS 502 is released and in page scan mode. At step 522, the BRNC 506 then instructs the AP2 508 to page the MS 502. The AP2 508 sends a Bluetooth page to the MS 502 at step 524, and the MS 502 responds to the AP2 508 at step 526. The AP2 508 then sends a L2CAP message to the MS 502 to establish connectivity at step 528, and the MS 502 sends a L2CAP acknowledgement message to AP2 508 at step 530. At step 532, the AP2 508 sends an acknowledgement to the BRNC 506. Finally, the BRNC 506 begins to monitor the RSSI from the MS 502 at the AP2 508 at step 534.

Figure 6:
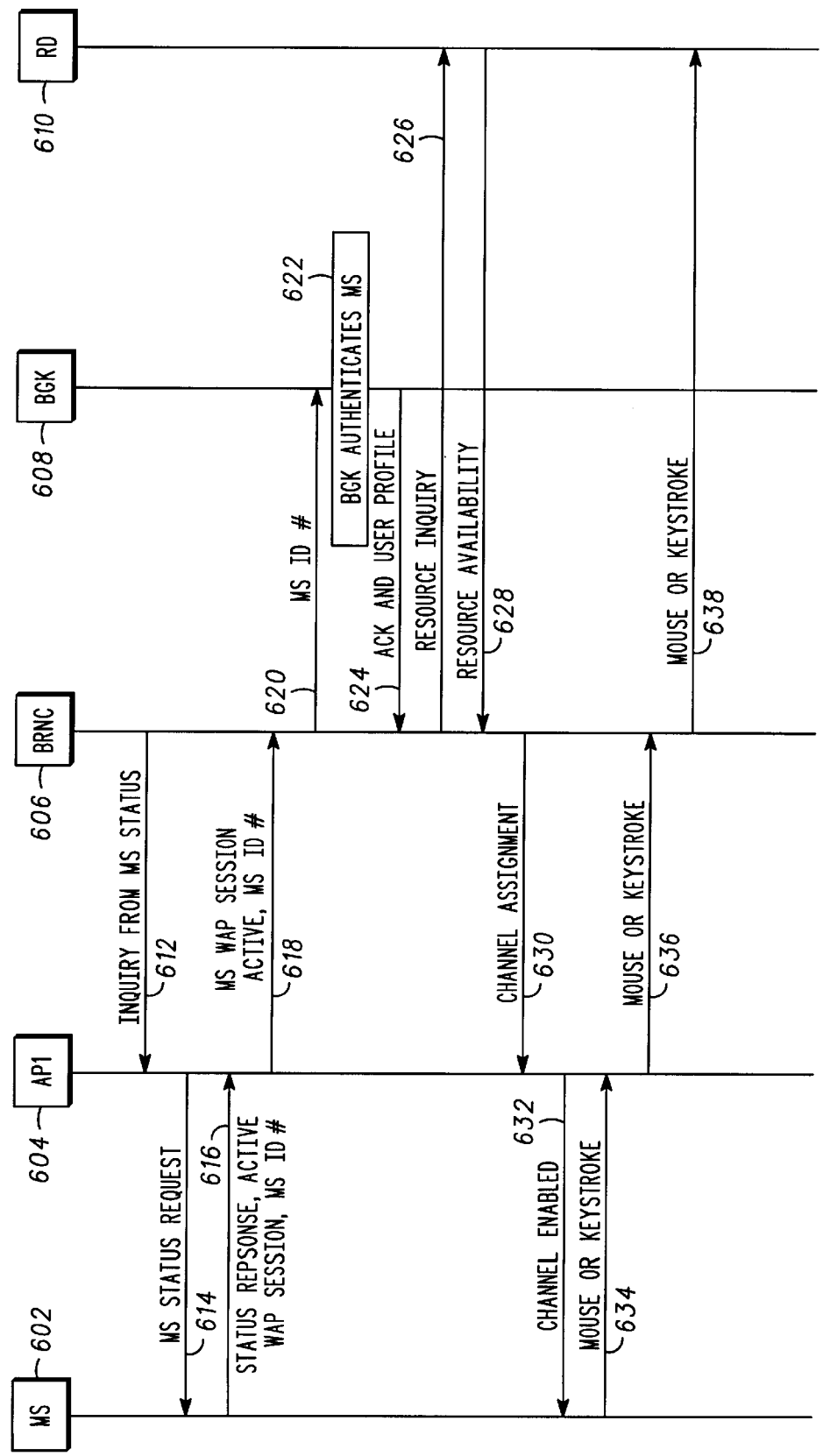
FIG. 6 is a timing diagram representing message flow for initiating a web session on a remote device in accordance with the preferred embodiments of the present invention.

In summary, the RSSI thresholds basically defines an area of signal coverage for a given access point. Where multiple access points measure identical RSSI values for a mobile station above an access point threshold value, the first available access point will be selected for connection. Generally, the access point that perceives the greatest RSSI value above the access point threshold value will establish connection to the mobile station. The benefit of using RSSI thresholds is that, as a user moves between areas of access point coverage, the access point connection will follow provided there is an access point available and that the RSSI is within the access point threshold value.

a) Referring to FIG. 6, there is provided a timing diagram representing message flow for initiating a web session on a remote device in accordance with the preferred embodiments of the present invention. The network elements comprise a mobile station ("MS") 602, a first access point ("AP1") 604, a Bluetooth Radio Network Control ("BRNC") 606, a Bluetooth Gate Keeper ("BGK") 608, and a remote device ("RD") 610, and are referenced at the top of FIG. 6. Once the MS 602 establishes connectivity to the network, a procedure is invoked for determining the resources available from the RD 610. Initially, the BRNC 606 sends a MS status inquiry to the AP1 604 at step 612, and the AP1 604 forwards the MS status inquiry to the MS 602 at step 614. At step 616, the MS 602 sends a response message to the AP1 604 indicating that MS 602 is engaged in a WAP session and providing its mobile station electronic identification number. At step 618, the AP1 604 sends a message to the BRNC 606 notifying it of the MS status and identification number. At step 620, the BRNC 606 sends the MS identification number to the BGK 608 and requests authentication. At step 622, the BGK 608 looks up the MS electronic identification number in a local database. If the MS 602 is not registered, the BGK 608 will send a broadcast message to other gatekeepers. At step 624, an acknowledgement message that includes a user profile is sent to the BRNC 606 if the BGK 608 is successful in authorizing the MS 602. The BRNC 606 then sends a resource inquiry message to the RD 610 to check the availability of resident functional entities at step 626, and the RD 610 sends a response message at step 628. At step 630, the BRNC 606 sends a channel assignment message to the AP1 604 if a resource is available, for example the Web browser. At step 632, the AP1 604 sends a message to the MS 602 informing MS that a channel is enabled. At step 634, the MS 602 may then send a user input (such as a mouse, joystick, or keystroke command) to the AP1 604. The AP1 604 forwards the user input to the BRNC 606, and the BRNC forwards the user input to the RD 610 for interpretation by the functional entity.

Where a remote device includes an access point and an output component, steps 636 and 638 are not required. The access point may communicate directly with a second functional entity, for example a Web browser, of the output component. The benefit of the above-described procedures is that a mobile station user can view and select media content utilizing a higher bandwidth connection of a second network, and without the certain constraints of the mobile station. Further, because the mobile station is still within the user's control, the capability of the mobile station is enhanced for the user. Still further, splitting the control and media display signals from the cellular network conserves traffic capacity resources of the first network.

The user profile mentioned above refers to a user configuration capability in which a mobile station user, for example a WAP-capable mobile phone user, may access and modify personal preferences for establishing network connections. This profile allows the user to select areas, e.g., geographic areas or by some other indicator, in which the capabilities of the preferred embodiments of the present invention would function, and enable or disable such capabilities. The user, therefore, has control over where and when an active browsing session will be transferred to a remote device or output component such that others might be able to observe.

The descriptions of the invention, the specific details, and the drawings mentioned above, are not meant to limit the scope of the present invention. For example, while the remote devices or output components employed in the preferred embodiments of the present invention are display devices, the remote devices or output components may be any type of device or functional entity that enhances the experience of a mobile station user when the user moves within a specified proximity of the remote device, the output component, or the functional entity.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for splitting control and media content signals of a cellular network connection of a mobile station comprising the steps of:
   determining a position of the mobile station relative to an access point;
   determining a status of the mobile station when the mobile station is within a proximity of the access point;
   authenticating the mobile station for access to a non-cellular network connection; and
   splitting a media content portion from the cellular network connection and rerouting it to a remote device via the non-cellular network connection.

2. The method of claim 1, further comprising the step of splitting a control portion from the cellular network connection and rerouting it from the mobile station to the remote device via the non-cellular network connection.

3. The method of claim 1, further comprising the step of maintaining the cellular network connection to route a control signal from the mobile station to the remote device via the cellular network connection.

4. The method of claim 1, wherein the step of determining the position of the mobile station relative to the access point includes the step of utilizing at least one signal strength threshold to define at least one corresponding proximity of the mobile station relative to the access point.

5. The method of claim 1, further comprising the step of connecting the mobile station an access point that is physically closest to the mobile station relative to other access points.

6. The method of claim 1, wherein the non-cellular network connection is at least one of a Bluetooth connection, a Wi-Fi connection and an infrared connection.

7. The method of claim 1, wherein the remote device provides at least one of visual information and audio information.

8. A method for splitting control and media content signals of a cellular network connection of a mobile station comprising the steps of:
   determining a position of the mobile station relative to an access point of a non-cellular network connection by measuring a signal strength of the mobile station by the access point;
   requesting a status of the mobile station when the mobile station is engaged in a data session with the cellular network connection and is within a proximity of the access point;
   receiving the status of the mobile station;
   authenticating that the mobile station has permission to access a non-cellular network connections and services associated with the non-cellular network connection;
   switching a connection of the mobile station from the cellular network connection to the non-cellular network connection;
   assigning a communication link from the mobile station to a remote device; and
   translating a user input generated at the mobile station into a signal that controls an action exhibited by the remote device.

9. A wireless communication system for switching network connections between at least one mobile station and a server, the system comprising:
   a gateway being effective to send content data and receive control data;
   a mobile station being effective to generate the control data and receive the content data;
   a first network connected to the gateway and being capable of communicating with the mobile station via a first wireless link, the first network being effective to transfer the content data from the gateway to the mobile station and the control data from the mobile station to the gateway; and
   a second network connected to the gateway and being capable of communicating with the mobile station via a second wireless link, the second network including an access point and a remote output device, the access point being capable of communicating with the mobile station via the second wireless link and forwarding the control data from the mobile station to the gateway, and the remote output device capable of receiving the content data from the gateway and presenting at least a portion of the content data.

10. The wireless communication system of claim 9, wherein a destination of the content data switches between the mobile station via the first network and the remote output device of the second network based upon a position of the mobile station relative to the access point.

11. The wireless communication system of claim 10, wherein:
   the destination of the content data switches from the mobile station to the remote output device when the mobile station is within signal range of the access point; and
   the destination of the content data switches from the remote output device to the mobile station when the mobile station is beyond signal range of the access point.

12. The wireless communication system of claim 9, wherein the control data switches between being provided via the first network and being provided via the second network based upon a position of the mobile station relative to the access point.

13. The wireless communication system of claim 12, wherein:
   the control data switches from being provided via the first network to being provided via the second network when the mobile station is within signal range of the access point; and
   the control data switches from being provided via the second network to being provided via the first network when the mobile station is beyond signal range of the access point.

14. The wireless communication system of claim 9, wherein the content data includes markup language code and the control data includes user input.

15. The wireless communication system of claim 9, wherein the first wireless link is a cellular communication system and the second wireless link is a short-range wireless connection.

16. The wireless communication system of claim 9, wherein at least one of the access point and the remote output device communicates with the gateway using a third wireless link.

17. The wireless communication system of claim 9, wherein the remote output device provides at least one of visual information and audio information.

18. The wireless communication system of claim 9, wherein the remote output device is only capable of presenting the at least a portion of the content data.

19. A wireless communication system for switching network connections between at least one mobile station and a server, the system comprising:

a gateway being effective to send content data and receive control data;

a mobile station being effective to generate the control data and receive the content data;

a first network connected to the gateway and being capable of communicating with the mobile station via a wireless link of the first network, the first network being effective to transfer the content data from the gateway to the mobile station and the control data from the mobile station to the gateway; and a second network connected to the gateway, the second network including a remote output device capable of receiving the content data from the gateway and presenting at least a portion of the content data, wherein the content data switches between being provided to the mobile station via the first network and being provided to the remote output device of the second network, whereas all of the control data is provided to the gateway via the first network.

20. The wireless communication system of claim 19, wherein:

the second network includes an access point being capable of communicating with the mobile station via a wireless link of the second network; and a destination of the content data switches based upon a position of the mobile station relative to the access point.

21. The wireless communication system of claim 20, wherein:

the destination of the content data switches from the mobile station to the remote output device when the mobile station is within signal range of the access point; and the destination of the content data switches from the remote output device to the mobile station when the mobile station is beyond signal range of the access point.

22. The wireless communication system of claim 19, wherein the content data includes markup language code and the control data includes user input.

23. The wireless communication system of claim 19, wherein the wireless link of the first network is a cellular communication system and the wireless link of the second network is a short-range wireless connection.

24. The wireless communication system of claim 19, wherein the remote output device provides at least one of visual information and audio information.

25. The wireless communication system of claim 19, wherein the remote output device is only capable of presenting the at least a portion of the content data.

* * * * *